UNITED STATES PATENT OFFICE.

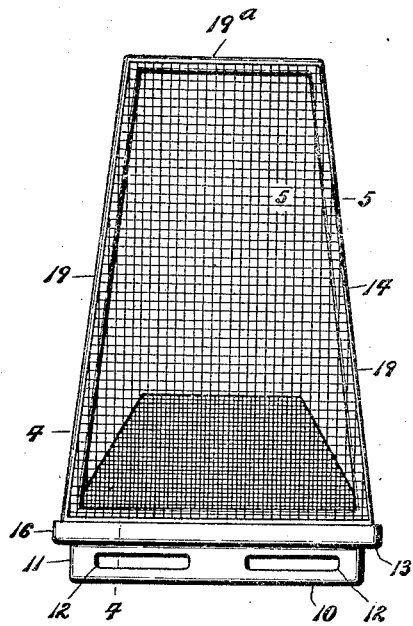
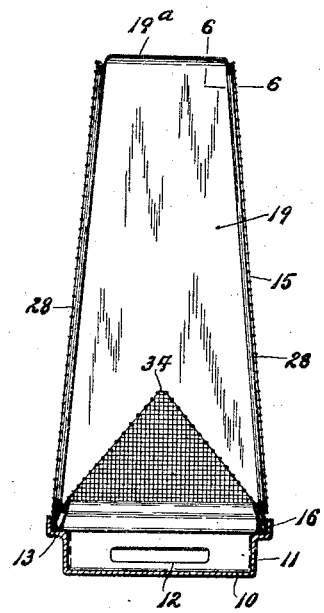
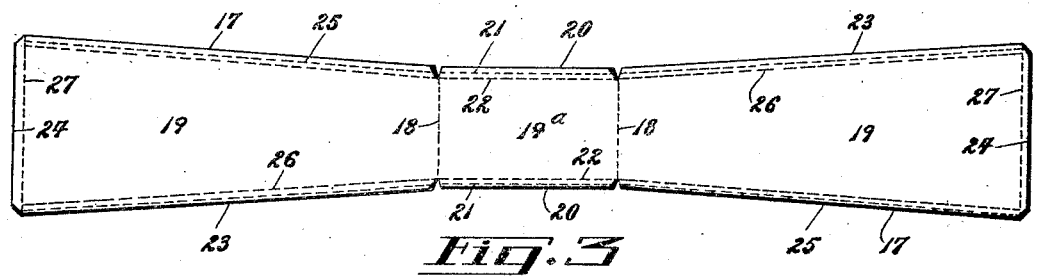
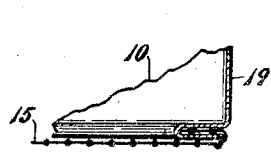
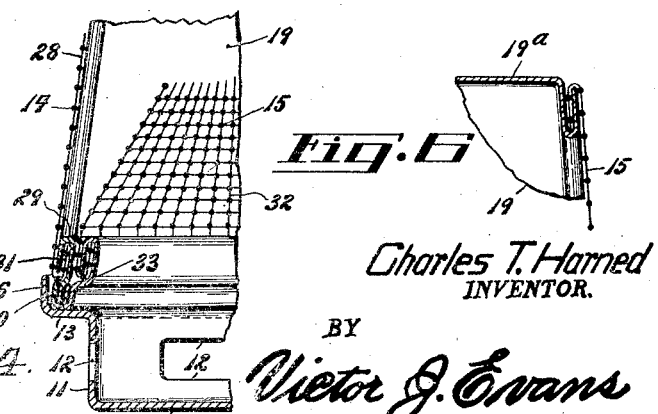

CHARLES T. HARNED, OF PHILADELPHIA, PENNSYLVANIA.

INSECT TRAP.

1,410,298.   Specification of Letters Patent.   Patented Mar. 21, 1922.

Application filed May 26, 1919, Serial No. 299,726. Renewed August 22, 1921. Serial No. 494,372.

*To all whom it may concern:*

Be it known that I, CHARLES T. HARNED, a citizen of the United States, residing at Philadelphia, in the county of Philadelphia and State of Pennsylvania, have invented new and useful Improvements in Insect Traps, of which the following is a specification.

This invention relates to insect traps, and it has more particular reference to that type of trap especially adapted for capturing flies and similar insects.

The main object of this invention is the provision of a trap of the nature referred to which is efficient in use and capable of economical and simple manufacture.

Another object of the invention is the provision of an insect trap which can be easily and quickly cleaned and maintained in operative position.

With these and other objects in view the invention consists essentially of a tray or pan provided with an upstanding circumferential flange which serves as a support for a truncated foraminous closure in the lower part of which is seated a smaller truncated vestibule.

The invention also further consists in the novel construction, combination and arrangement of the parts hereinafter fully described and more specifically pointed out by the appended claim.

In the further disclosure of the invention reference is to be had to the accompanying sheet of explanatory drawings, constituting a part of this specification, and in which similar characters denote the same or corresponding parts in all the views; and in which:—

Figure 1 is a vertical elevation of an insect trap embodying the present improvements.

Figure 2 is a vertical section of the same and taken at right angles to the preceding figure.

Figure 3 is a plan view of the blank from which the closure is mainly constructed.

Figure 4 is a fragmentary enlarged detail taken approximately on the line 4—4 of Figure 1.

Figure 5 is a fragmentary horizontal section taken on the line 5—5 in Figure 1; and, Figure 6 is a similar fragmentary vertical section, taken on the line 6—6 in Figure 2.

Referring to the drawings, the numeral 10, designates a pan conveniently made of sheet metal, which is rectangular in plan and provided around its edges with upstanding walls 11, in which are openings 12, for the entry of flies and similar insects, and said pan 10 serves as a container for the bait. The walls 11, are outwardly flared substantially horizontal to constitute a seat 13 for the closure or trap 14 as well as a vestibule 15, and are then upwardly turned substantially vertical at 16, to form a surrounding flange which prevents the accidental displacement of the closure 14 and vestibule 15.

The closure or trap 14 is preferably made from a blank 17—Figure 3—which is scored along the dotted lines 18, for folding the blank so that it constitutes side walls 19, 19, and a top portion 19ª and it is to be noted that the walls 19, 19, when folded to the position shown in Figure 1 give the closure a truncated pyramidal formation or an approximately inverted U-shape in vertical section. The opposed edges 20—20 of the top portion 19, are scored or creased along the dotted lines 21, 22, and the inclined edges 23, and ends 24, of the side walls 18, are similarly creased along the lines 25, 26, and 27, respectively for the purpose hereafter explained.

When the blank 17 is bent to the formation shown in Figure 1, I attach the opposed foraminous material walls 28, 28, as follows:—

The sheets of foraminous material 28, are laid along the inclined edges 23 of the walls 19, and the said edges are then folded over on the lines 25, 25 and the two materials closely pressed together whereupon the edges 23 are bent at right angles along the lines 26, so that the foraminous material and sides walls are firmly connected together and no projecting edges or strands of the foraminous material protrude. The ends 24 are folded back upon the walls 19, to stiffen the lower edges thereof, and the upper edges 20, are similarly united to the upper part of th foraminous material by folding along the lines 21, 22. Finally opposed strips of sheet metal 29 are folded along their lower edges at 30—Figure 4—and united to the lower edge of the foraminous material 28 as shown at 31, in the same figure, and these strips are finally soldered or brazed to the lower ends of the walls, 19, 19, to complete the rectangular circumferential base of the closure or trap 14.

The vestibule 32, consists of a sheet of foraminous material moulded or otherwise shaped to a truncated pyramidal contour as shown and is secured at its lower edge to a circumferential band or strip of sheet metal 33, in the manner above described, and as will be clearly understood on an examination of Figure 4, and said vestibule 32, is provided at its upper central portion with a narrow longitudinal opening 34 of sufficient size to permit flies or similar insects to pass through the same into the closure or trap 14. It is to be here remarked that the base of the vestibule 32, is made of a size or dimensions to fit snugly into the base of the closure or trap 14, but adapted for easy removal therefrom.

In use the insect trap is placed in the desired position and the pan 10 which serves as a container for the bait, supplied with sugar or other suitable material whilst it serves as a support for the closure 14, and vestibule 15. Insects approaching the trap are attracted by the bait and enter the pan through the openings 12 therein and after feeding on said bait they will try to fly away, and in their natural flight or upward ascent will note the opening 34 in the top of the vestibule 15 and pass therethrough into the closure 14 where they will be trapped or corralled. On the other hand insects which crawl after feeding on the bait will travel upwardly through the opening 34, and become similarly trapped in the closure 14.

When it is desired to clean the insect trap and destroy the corralled insects, such operation may be readily effected by immersing the trap in hot water or other destructive medium, then separating the closure 14 from the pan, withdrawing the vestibule 15 and emptying out the dead insects. Reassembly of the parts is effected by first inserting the vestibule 15, in the base of the closure 14, and then seating the closure on the flange 13 in the pan 10, after said pan has been baited.

From the foregoing, it will be readily seen that by my invention, I provide a very simple and effective insect trap, and furthermore one which is extremely cheap to manufacture, whilst there are no projecting edges which may accidentally cut or injure the hands of the user.

Whilst I have described and shown a preferred construction of my invention, I wish it understood that various changes may be made in the shape and cross section, and slight modifications effected without departing from the spirit of the invention as set forth, and I desire to avail myself of such reasonable variations and modifications as fairly come within the scope of the appended claim.

Having described my invention, what I claim is,—

As a new article of manufacture, an insect trap comprising a pan and inter-fitting closure therefor, the closure consisting of a single piece of material bent to form a top and ends each of which is formed with opposed longitudinal inwardly and outwardly bent flanges, and side walls for the closure of a foraminous material having its side and top edges bent in opposed directions to fit into the respective flanges of the top and ends.

It testimony whereof I affix my signature.

CHARLES T. HARNED.